Jan. 20, 1959     C. M. ASHLEY     2,870,020
METHOD OF BLANCHING FOOD PRODUCTS
Filed Nov. 14, 1951     10 Sheets-Sheet 1

INVENTOR.
Carlyle Martin Ashley
BY Herman Seid
atty.

Jan. 20, 1959  C. M. ASHLEY  2,870,020
METHOD OF BLANCHING FOOD PRODUCTS
Filed Nov. 14, 1951  10 Sheets-Sheet 2

INVENTOR.
Carlyle Martin Ashley
BY Herman Seid
atty.

Jan. 20, 1959  C. M. ASHLEY  2,870,020
METHOD OF BLANCHING FOOD PRODUCTS
Filed Nov. 14, 1951  10 Sheets-Sheet 3

INVENTOR.
Carlyle Martin Ashley
BY Herman Seid
atty.

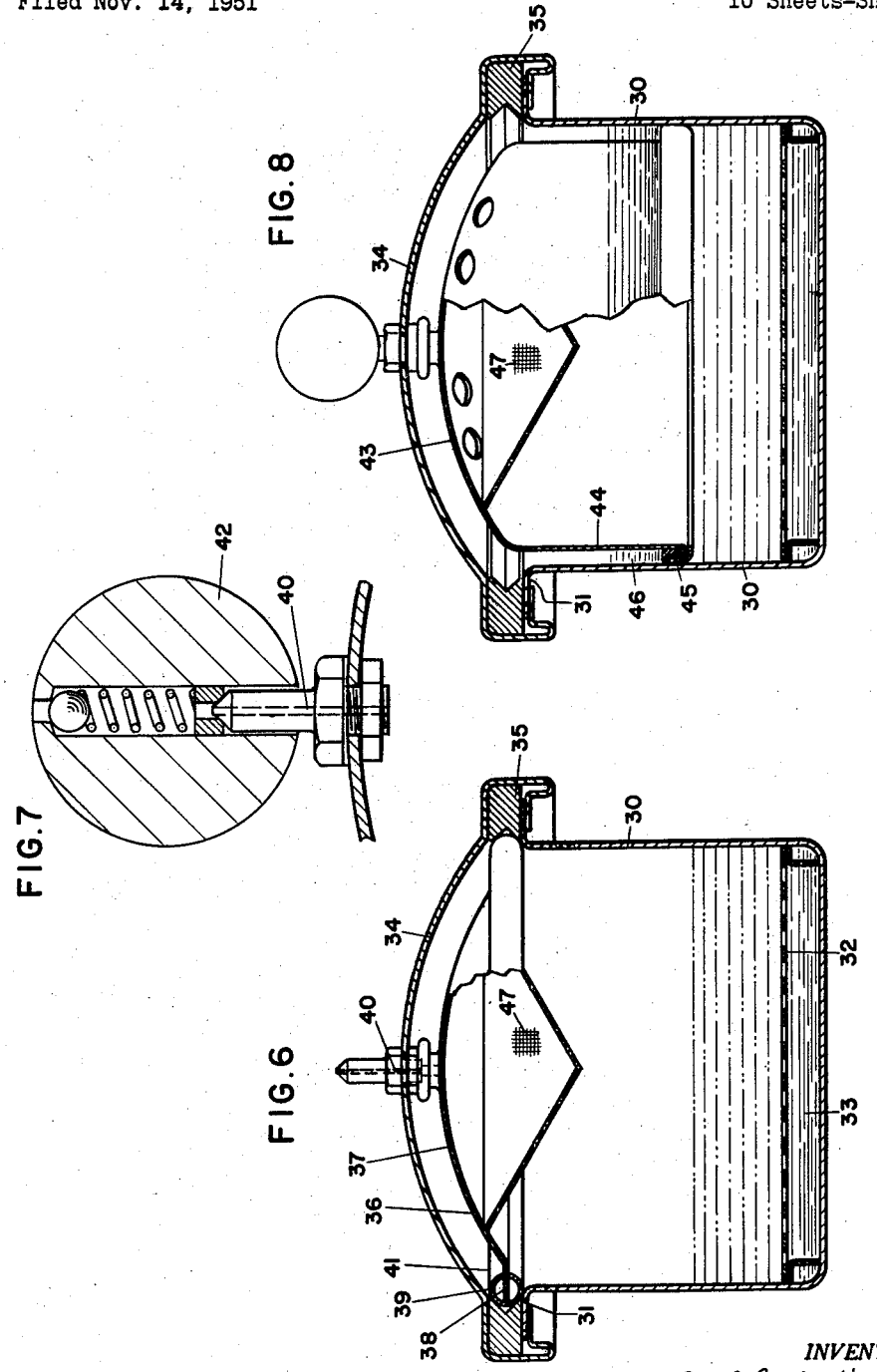

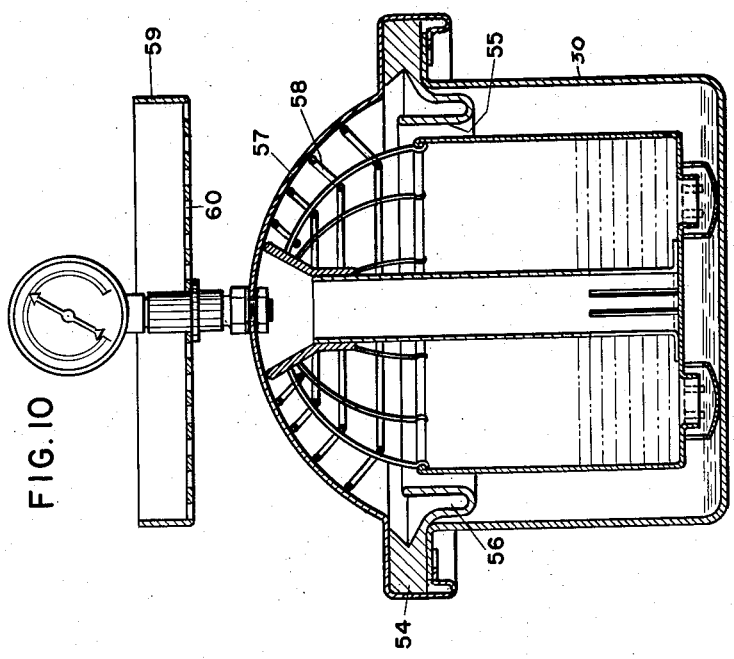
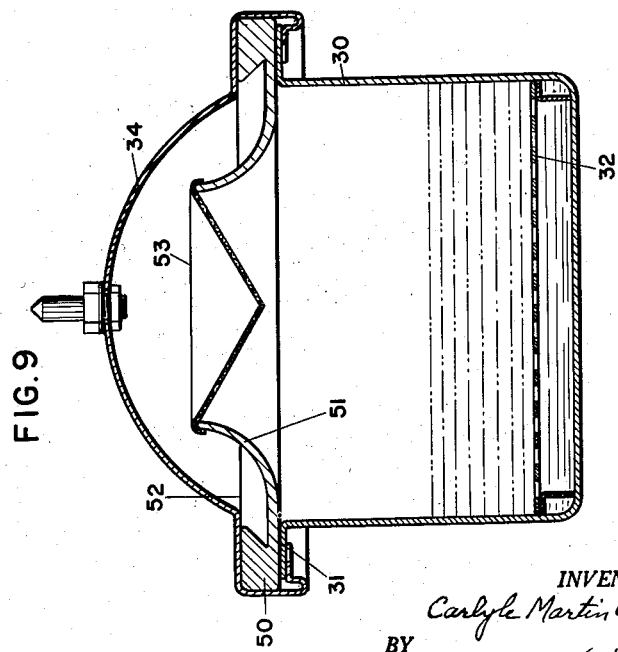

Jan. 20, 1959   C. M. ASHLEY   2,870,020
METHOD OF BLANCHING FOOD PRODUCTS
Filed Nov. 14, 1951   10 Sheets—Sheet 6
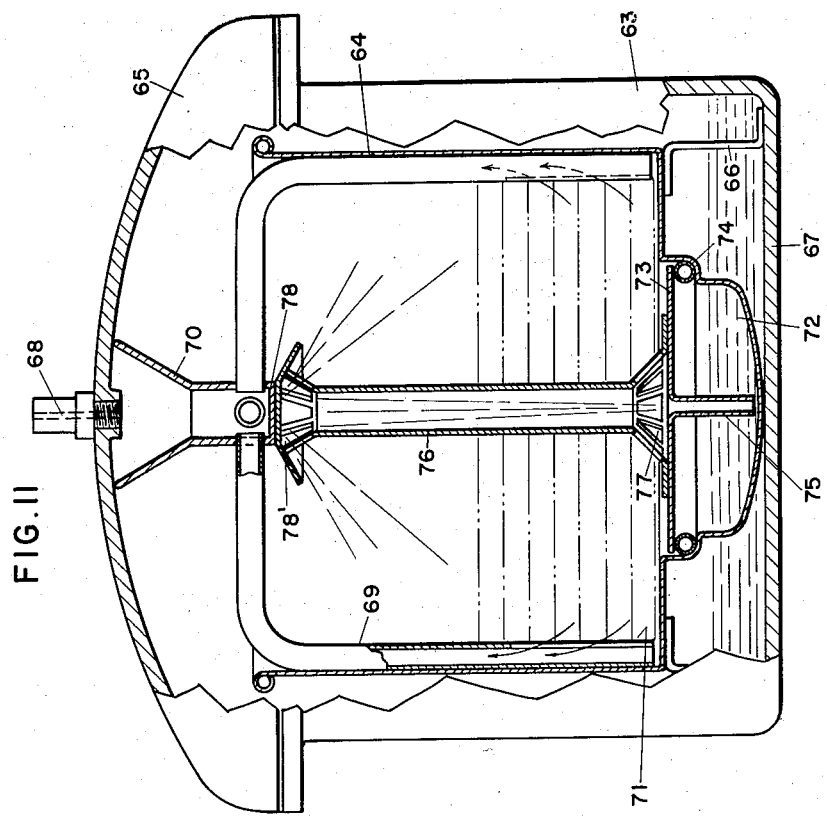
INVENTOR.
Carlyle Martin Ashley
BY Herman Seid
Atty.

Jan. 20, 1959   C. M. ASHLEY   2,870,020
METHOD OF BLANCHING FOOD PRODUCTS
Filed Nov. 14, 1951   10 Sheets-Sheet 7

INVENTOR.
Carlyle Martin Ashley
BY
Herman Seid
Atty.

Jan. 20, 1959  C. M. ASHLEY  2,870,020
METHOD OF BLANCHING FOOD PRODUCTS
Filed Nov. 14, 1951  10 Sheets-Sheet 8

INVENTOR.
Carlyle Martin Ashley
BY Herman Seid
Atty.

Jan. 20, 1959 C. M. ASHLEY 2,870,020
METHOD OF BLANCHING FOOD PRODUCTS
Filed Nov. 14, 1951 10 Sheets-Sheet 9

INVENTOR.
Carlyle Martin Ashley
BY Herman Seid
Atty.

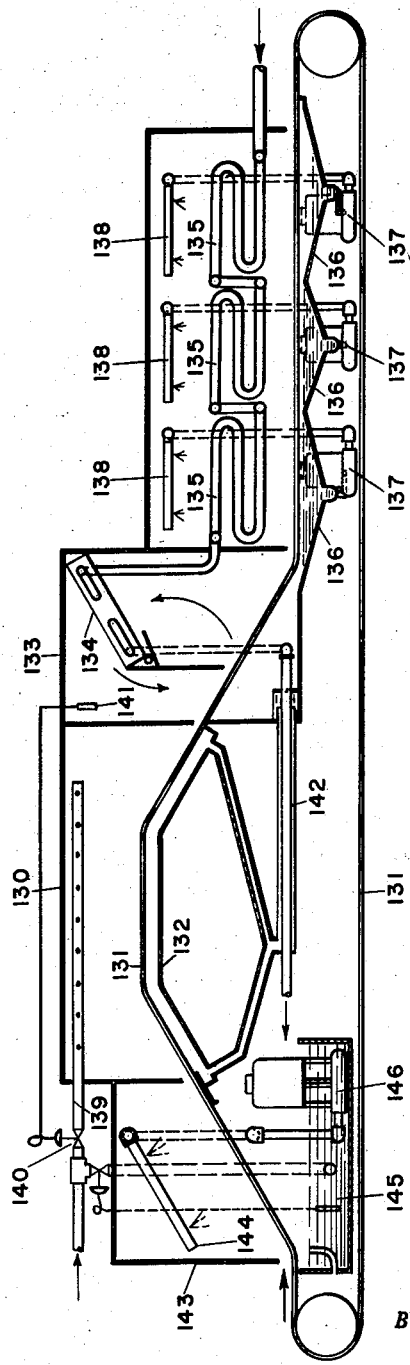

United States Patent Office 2,870,020
Patented Jan. 20, 1959

2,870,020

METHOD OF BLANCHING FOOD PRODUCTS

Carlyle Martin Ashley, Fayetteville, N. Y., assignor to Carrier Corporation, Syracuse, N. Y., a corporation of Delaware Application November 14, 1951, Serial No. 256,315

4 Claims. (Cl. 99—154)

This invention relates to a method of blanching or scalding and subsequent cooling of food products and equipment therefor and, more particularly, to a method of steam blanching food products in which dissolved solids are returned to the food product preferably during the cooling operation and to apparatus for steam blanching food products, collecting dissolved solids, and returning the dissolved solids to the food product during the cooling operation.

In food freezing, either domestic or commercial, it is essential to blanch or scald the food product, particularly vegetables, before the freezing operation to destroy or render inactive the enzymes to prevent the appearance and taste of the frozen product being deleteriously affected. While blanching is conducted to destroy the principal enzymes, overblanching should be avoided.

Blanching has generally been conducted by means of boiling water or steam. Water blanching is not satisfactory for it results in a decrease in the nutritive value of the food product since a large proportion of the juices and dissolved solids such as vitamins and minerals are washed away. It may result in a relative loss in weight in the final product which is extremely serious in commercial applications since the product is sold by weight. The water supply too many affect the texture, appearance, odor, flavor, nutritive value or storage life of the product since it may contain materials injurious to any or all of such factors; to avoid damage to the food product from the water supply, it is customary in larger freezing plants to provide expensive water treatment equipment.

In the steam blanching processes as heretofore conducted, the solids dissolved in the condensate are not returned to the product but are wasted. A further disadvantage rests in the fact that in the processes used heretofore the product is washed with water when it is in a soft, porous condition to cool the same with resulting loss of a considerable additional percentage of solids.

The chief object of the present invention is to eliminate the present disadvantages of steam blanching and water cooling.

An object of the present invention is to provide a method of steam blanching in which nutrients are returned to the food product prior to freezing. The term "nutrients" is used herein to designate dissolved solids such as minerals, vitamins, proteins, carbohydrates, etc.

A further object is to provide a method of steam blanching in which nutrients are returned to the food product during the cooling operation.

A still further object is to provide a method of steam blanching and cooling in which condensate and juices given off by the food product during the steaming operation are evaporated under vacuum while in contact with the food product to cool the same, to restore the original weight and to return the dissolved solids to the food product.

A still further object is to provide a method of blanching in which steam is introduced and air and other non-condensible gases are removed in such manner that a minimum of oxygen is in contact with the heated food product to cause oxidation.

A still further object is to prevent the reintroduction of bacteria to the heat-sterilized food product by contact with non-sterile water.

A still further object is to provide apparatus for steam blanching and subsequent cooling of food products adapted for domestic or commercial use.

A still further object is to provide blanching apparatus in which condensate is removed from the food product at the end of the heating operation.

A still further object is to provide apparatus to blanch a food product and to cool the same while returning dissolved solids and juices thereto to restore its original weight, flavor and appearance. Other objects of the invention will be readily perceived from the following description.

This invention relates to a method of blanching and cooling food products in which the steps consist in placing a heated vapor in contact with the food product to heat the same, collecting nutrients given off by the food product during the heating operation, cooling the heated food product and distributing the collected nutrients over the food product to restore substantially the original nutrients, including vitamins and minerals.

This invention further relates to a method of blanching and cooling food products in which the steps consist in circulating a heated vapor over a food product to heat the same while condensing at least a portion of the vapor upon the product, discontinuing the supply of heated vapor, and then creating a vacuum about the food product to evaporate liquid present on the surface of the food product to cool the same.

This invention further relates to apparatus for blanching and cooling food products which comprises, in combination, means for supplying a heated vapor over the food product to heat the same thereby condensing at least a portion for the vapor, means for collecting at least a portion of the nutrients given off by the food product when it is contacted by the vapor, and means for distributing at least a portion of the collected nutrients over the food product to restore a substantial portion of the original nutrient content.

The attached drawings illustrate preferred embodiments of the invention, in which Figure 1 is a view in section of a blanching and cooling device for domestic use;

Figure 6 is a sectional view of a modified blanching and cooling device;

Figure 7 is a sectional view of a pressure relief valve;

Figures 8, 9, 10 and 11 are sectional views of modified blanching and cooling devices;

Figure 15 is a diagrammatic view of a modified blanching and cooling device for commercial use.

Figure 1:
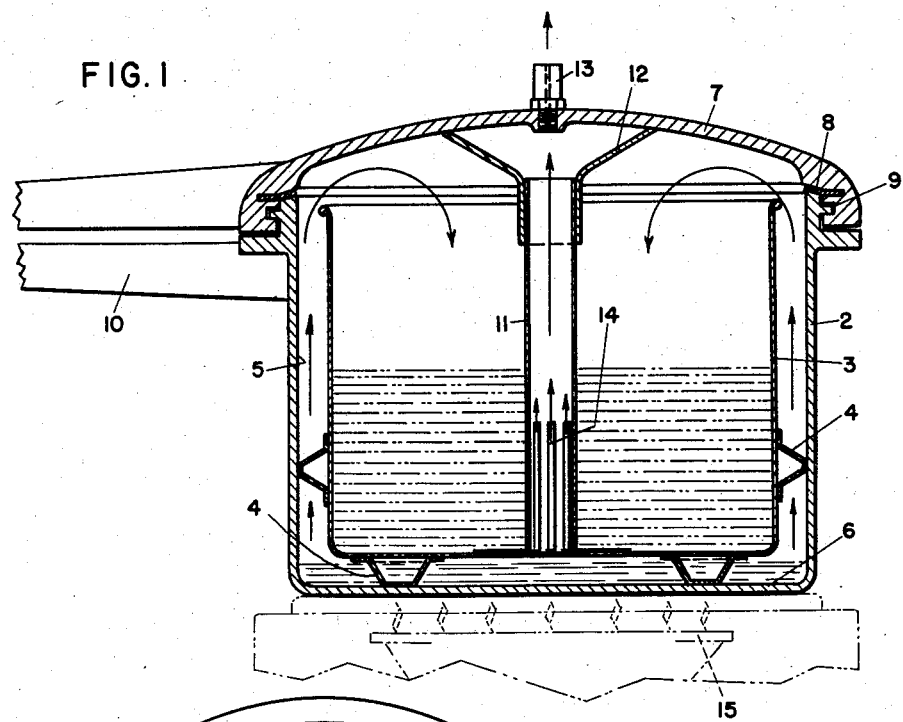
Figure 2:
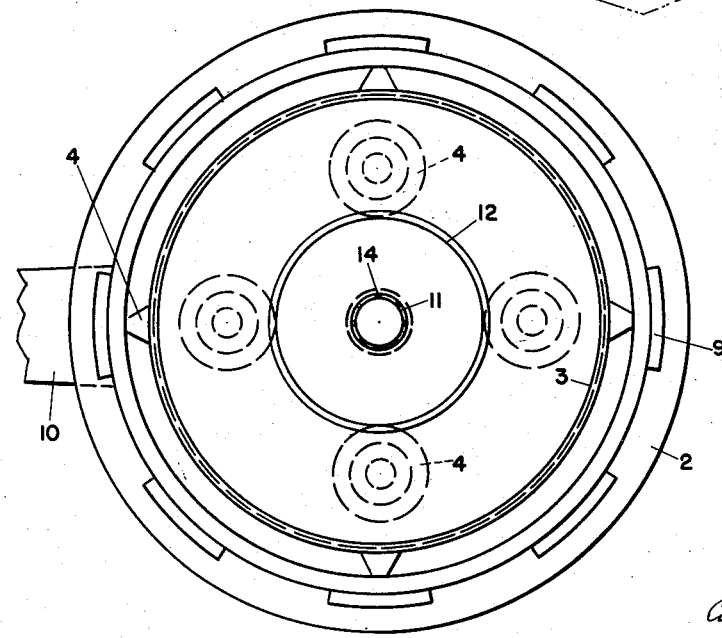
Figure 2 is a plan view of the device shown in Figure 1 having the cover removed.

Referring to the drawings, there is shown in Figure 1 a simple, economical blanching device for domestic use embodying the invention. The device comprises an outer vessel or pan 2 and an inner vessel or pan 3. Spacing members 4 are provided, preferably attached to vessel 3, to space vessel 3 from the wall 5 and bottom 6 of vessel 2 thereby forming a passageway between the inner and outer vessels for a purpose hereinafter explained. A cover 7 fits over vessel 2, a gasket 8 being securely clamped between the cover and vessel 2 to seal the vessel. Any suitable means such as lugs 9 may be used to attach the cover to the vessel. A handle 10 may be attached to vessel 2 to permit ready and easy handling thereof. The bottom of the outer vessel 2 forms a sump below vessel 3 for a liquid medium such as water.

A tube 11 is placed centrally of inner vessel 3 and extends substantially vertical from the bottom adjacent the cover. The upper portion of tube 11, preferably a flexible extension 12 thereof, contacts the cover 7. A pressure relief vent 13 such as is commonly employed in pressure cooking apparatus is placed in the cover within the area of extension 12. Slits or slots 14 are formed adjacent the bottom of tube 11 to permit communication between the inner vessel 3 and the interior of the tube 11, the tube 11 serving as a passageway to connect the interior of vessel 3 with the ambient atmosphere.

Considering the use of this device for domestic blanching, the food product is placed within vessel 3 and the cover 7 is applied to vessel 2 securely closing the vessel. Water in the sump of vessel 2 is heated by any suitable heating member such as the gas burner 15 of a stove. The water boils, steam vapor flowing upward through the passageway between the inner and outer vessels and downward in the inner vessel thereby displacing the heavier air or other non-condensible gases downward in the inner vessel, forcing the non-condensible gases through the slots 14 into tube 11 and venting the non-condensible gases to the ambient atmosphere. A minor portion of the steam is of course vented to the atmosphere, but the purging of air is done very completely, since its downward displacement prevents appreciable mixture with the steam. The vapor passing over the surfaces of the food product in the inner vessel heats the same while condensing in part upon the surfaces of the food product. The heating operation releases the juices of the food product as well as dissolves solids such as vitamins and minerals in the condensate. The heating operation is discontinued after a predetermined heating period, the length of which depends upon the kind of food product being blanched. In domestic blanching, the heating period may be discontinued by extinguishing the gas burner 15 or by removing the closed vessel therefrom.

Figure 3:
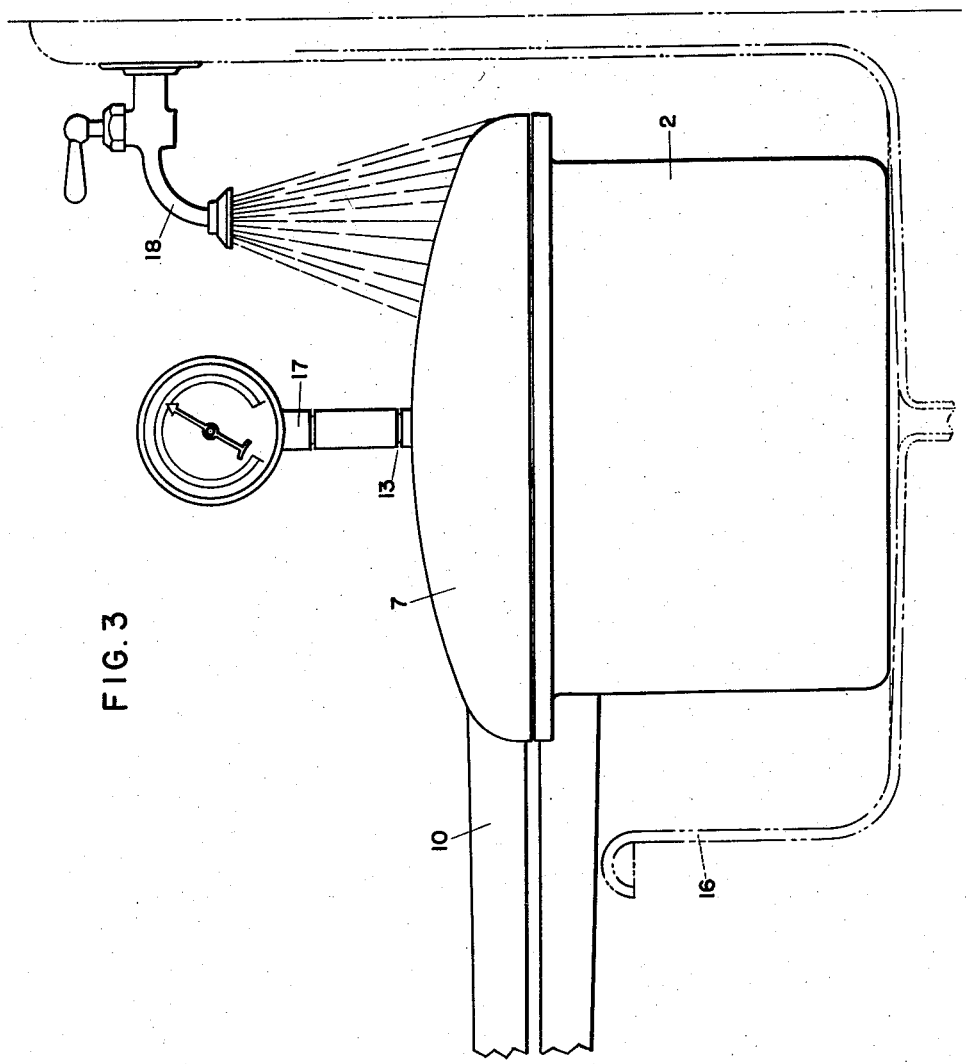
Figure 3 is a view in elevation of the blanching and cooling device shown in Figure 1 during the cooling and rewetting operation.

Preferably, in domestic blanching, the closed vessel 2 is removed immediately from the stove to the sink 16 (refer to Figure 3). A vacuum gauge 17, as shown in Figure 3, is attached to the vent 13 to close the passageway between the inner vessel and the ambient atmosphere. A stream of cooling water from a faucet 18 is directed over the cover 7. The cooling water condenses the vapor in vessel 3, decreasing the pressure therein and thereby causing evaporation of condensate from the food product to cool the same. The decrease in temperature in vessel 3 causes condensate and juices collected at the bottom thereof to boil upwardly through the food product to rewet the same thereby restoring the original weight of the food product and returning at least a portion of the original nutrients to the food product. Since the presence of even a slight trace of air or non-condensibles greatly retards the condensing on the vessel and evaporation from the food, it is highly important that the vessel be sealed securely and that all of the air be vented during the heating process.

The vapor in vessel 3 contacts the cover 7, condenses and runs down the cover and the inner wall 5 of the outer vessel 2 to the sump in the bottom of the outer vessel. The water condensed on the food product during the heating operation is in roughly the same amount as the amount of water evaporated therefrom during cooling through approximately the same temperature range. The juices are retained in the inner pan or vessel with the food product and are frozen therewith during the subsequent freezing operation. Any slight amount of juice remaining in the inner pan is usually poured over the food in the freezing package thus returning virtually all of the dissolved solids to the food.

The blanching operation described inactivates the enzymes without affecting adversely the flavor, texture, appearance or odor of the food product and maintains the nutritive value since the nutrients are returned to the food product. In addition, substantially the original weight of the product is restored although this is of less value in domestic blanching than in commercial blanching.

Figure 4:
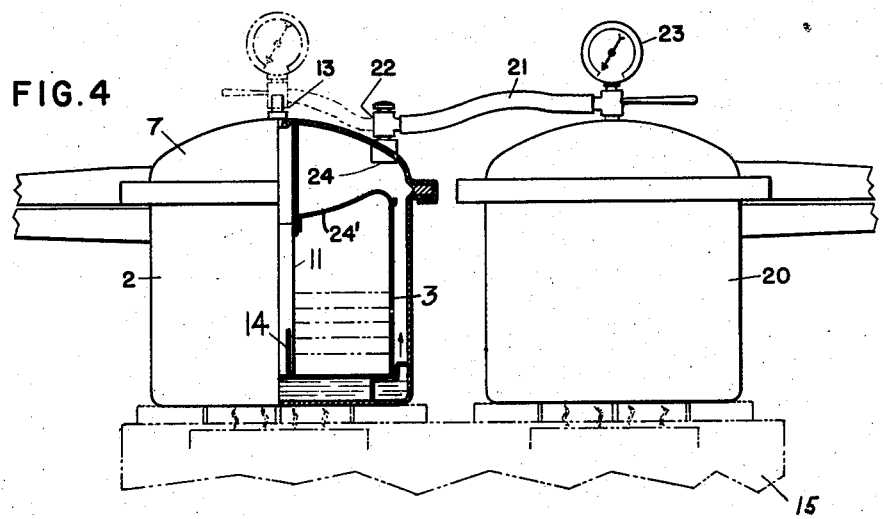
Figure 4 is a view partly in section and partly in elevation of a blanching device having an additional steam supply.

Under some circumstances, it may be desirable to furnish an additional quantity of steam to the blanching device to expedite the operation. Figure 4 illustrates a modification of the invention in which a supplemental steam supply is provided. A second vessel 20 is placed adjacent vessel 2 on the heating means 15 and is connected to vessel 2 by a flexible line 21 and connection 22. Vessel 20 is provided with a pressure regulator 23 so that a quantity of water may be heated initially to a higher temperature than the boiling temperature to supply an immediate source of steam to vessel 2. The end of connection 22 within vessel 2 may be provided with a diffuser 24 to diffuse steam from vessel 20 within vessel 2. Steam, of course, is introduced at the top of the vessel to assure non-condensible gases being purged therefrom. At the end of the heating operation the gauge is removed from vessel 20, placed on the vent connection of vessel 2 thus sealing it and the cooling and rewetting operation conducted as previously described. A foam breaker 24' is preferably provided at the top of inner vessel 3.

Figure 5:
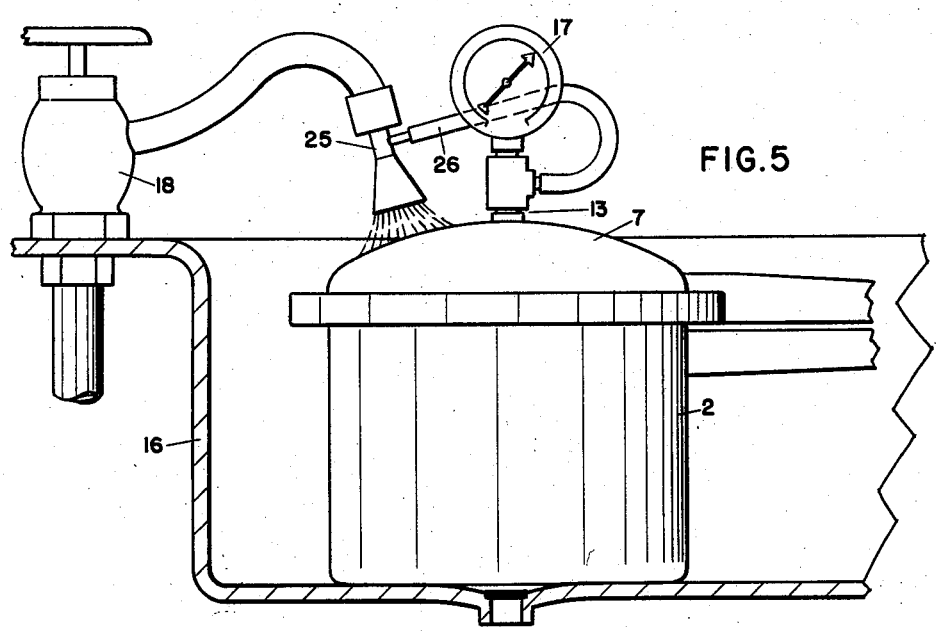
Figure 5 is a view in elevation of a blanching and cooling device similar to the device shown in Figure 1 provided with an additional means for purging non-condensible gases.

In Figure 5, I have shown the blanching device provided with additional purge means which may be desirable under some conditions. A water ejector 25 is placed on the faucet 18 and the vent 13 is connected thereto by a line 26. This ejector permits the vacuum in vessel 2 to be drawn to a point corresponding to the vapor pressure of the water. To increase vapor removal from the food chamber (by condensation), the water from ejector 25 is sprayed on the cover 7 of vessel 2. With this arrangement, complete venting during the heating operation is relatively unimportant since the effect of slight leaks in vessel 3 is offset thus assuring the lowest possible final temperature of the food product.

In Figure 6, a modification of the invention is illustrated in which means are provided for removing excess water added at the beginning of the blanching process. Since no inner vessel is provided to facilitate venting of the non-condensibles, this arrangement is particularly suited for use with those foods whose juices tend to foam readily, thus bodily displacing the air from the vessel. There is shown a vessel or pan 30 terminating in an outwardly extending flange 31. A perforated support 32 for the food product is spaced from the bottom of the vessel, the space between the support and the bottom of the vessel serving as a sump 33 for water or other heating medium. A cover 34 clamps a gasket 35 against flange 31 to securely close the vessel. A cone-shaped or dome-shaped member 36 having perforations 37 centrally thereof to permit vapor to pass therethrough is placed between the cover and the vessel. The downward coned perforation central section 47 serves to break foam created during the heating operation. A similar inverted cone-shaped cover (also shown in Figure 9) can be used on the inner vessel 3 of Figure 1 if desired to break up foam during the cooling operation which might carry over juices into the outer vessel 2.

The peripheral edge 38 of member 36 carries a gasket 39 which is placed adjacent gasket 35 when member 36 is in place. The usual pressure relief vent 40 is provided in cover 34. Cover 34, gasket 39, and member 36 cooperate to provide a storage space 41 for condensate during the cooling operation.

When the heating operation is completed, the usual gauge is attached to vent 40 and cold water sprayed over the vessel to reduce the pressure therein. Water in the vessel evaporates to cool the product, a portion of the vapor condensing as it strikes the cool cover and collecting in space 41, whence it may be easily removed when the vessel is opened to remove the food product. The device illustrated avoids extra water in the food product, since substantially all the water vapor used for heating purposes may be condensed, collected and removed from the product. The size of the storage space is predetermined, of course, by the amount of condensate anticipated, such amount being related to the amount of food in the vessel and the temperature change. Ordinarily, this is about one ounce per pound of food cooled plus one ounce for cooling the pan per 70° cooling range.

The device shown is desirable for use in any vapor cooking process, in order that excess water added at the beginning of the cooking process, to avoid food running dry during the cooking operation, may be removed. If desired, a pressure regulator with a vacuum breaker valve 42 may be used when the device is employed for cooking. When the cooking process is completed, the device is placed under a stream of cold water and the pressure reduced to amospheric or preferably somewhat below atmospheric pressure. To regulate the amount below atmospheric pressure, valve 42 is applied to the pressure regulating means. Since its purpose is to interrupt the cooling process before it is complete, as the vacuum in the vessel reaches a predetermined amount, air will be permitted to enter the vessel to stop condensation. An advantage of this procedure resides in the fact that juices and dissolved solids are retained with the food product.

It will be appreciated that during the cooling operation it is desirable that the vessel be spaced from the bottom of a sink in order that the base of the vessel is not cooled. It is preferable that the cooling water be directed on the cover; the extended portion of the cover serves as a skirt to direct water impinging upon the cover away from the vessel to prevent contact of the cooling water with the sides of the vessel which would be undesirable.

In Figure 8, there is shown a modified form of the device shown in Figure 6. In this case, dome-shaped member 43, generally similar to member 36, is provided with a downwardly extending skirt 44 spaced from the wall of the vessel 30. The lower edge of skirt 44 carries a gasket 45 which seals against the wall of the vessel to provide a storage space 46. Foam breaker in the form of screen 47 may be provided. In other respects, this device may function similarly to the device shown in Figure 6. As illustrated, it is adapted for use primarily in vacuum cooking procedures but, as previously described, it may be employed for blanching and cooling.

The device illustrated in Figure 9 is similar to the device illustrated in Figure 6 except that it contains modified means for collecting condensate during the cooling process. In the device shown in Figure 9, gasket 50, which forms the seal between cover 34 and vessel 30, is provided with an inwardly and upwardly extending portion 51, which, in cooperation with cover 34, forms a storage space 52 for condensate. It will be appreciated the length of extended portion 51 depends largely upon the capacity of the storage space required. If desired, a conical screen or perforated plate 53 may be attached to the top of the gasket (the protruding edge of portion 51) to break up any foam which might otherwise be carried over to the storage space 52.

It will be appreciated that in the devices shown in Figures 6, 8 and 9, the skirt on the outer edge of the cover is so formed as to deflect water from the walls of the vessel thereby confining cooling to the cover. Too, in the devices shown in such figures, removal of air from some vegetables may not be as satisfactory as in the devices earlier described so that the ejector arrangement shown in Figure 5 is particularly desirable for use.

The final amount of juices remaining in the food product may be larger or smaller than with the devices earlier described. The change in water is equal to the amount of water initially placed in the vessel for heating medium minus a quantity consisting of the amount of vapor vented plus the amount of vapor condensed and collected separately. In other words, there may be a gain in weight or a slight loss in weight of the food product.

Figure 10 illustrates a device in which the excess condensate storage feature is embodied in a blanching device generally similar to that shown in Figure 1. In the device shown in Figure 10, gasket 54 is provided with a downwardly, inwardly and upwardly extending portion 55 which forms a storage space 56 for excess condensate. Preferably the cover 57 is provided with deflector rings 58 which interrupt flow of water down the sides of the cover and vessel and permit some portion of the condensate to return to the food product in case it is not fully wet by foaming from below. While storage space for excess condensate is provided, it will be appreciated the food product will not be dried to an undesirable extent by evaporation, since some portion of the liquid will be returned to the food product. A pan 59 provided with perforations 60 may be placed above the cover 57 to assure equal distribution of cooling water over the surface of the cover. The quantity of condensate collected will be a fraction of the total amount of condensate minus condensate diverted to the food product by rings 58. Preferably, the drains are trapped to prevent vapor blowing up underneath.

This arrangement differs from that of Figure 1, since free communication of liquid between the inner and outer chambers is provided. With the arrangement of Figure 1, the weight of the food plus any slight remaining juice at the end of the cooling process will be substantially the same as the initial weight of the food. In the present modification, the final weight of juice and food can be either greater or less than the initial weight. Enough initial water must be provided in the outer pan 30 so that vapor may be lost during the heating process without permitting pan 30 to run dry. Then during the cooling process a portion of the remaining condensate is collected in space 56 while the remainder of the juice and condensate is used to rewet the food (some slight portion remaining as juice at the end of the process). If the steam vented plus the condensate collected in space 56 exceeds the water initially placed in pan 30, then the weight of food and juice will decrease; if the reverse, the weight will increase. In other respects, during the blanching and cooling operations, the device operates similarly to the device shown in Figure 1.

In Figure 11 there is shown a modified blanching device for domestic use. This device comprises an outer vessel or pan 63 and an inner vessel or pan 64. A cover 65 securely closes vessel 63. Pan 64 is supported some distance from the bottom of pan 63 by a support member 66. The bottom of pan 63 forms a sump 67 for liquid heating medium. The usual pressure release vent 68 is formed in cover 65. Tubes 69 are provided adjacent the wall interior of pan 64 and lead to an extension 70 adjacent cover 65. The bases of tubes 69 are provided with slots 71. Tubes 69 and extension 70 form a passageway connecting the inner pan with ambient atmosphere in order that non-condensible gases may be removed from the vicinity of the food product.

A condensate pan 72 extends downward from pan 64 within sump 67. Pan 72 is provided with a cover 73, gasket 74 sealing the space between cover 73 and the wall of pan 72. A tube 75 extends downward in pan 72.

A tube 76 placed centrally of pan 64 extends upward therein. Tube 76 is provided with slots 77 to permit condensate to flow into tube 75 and to collect within pan 72. A target 78 is placed above tube 76.

During the blanching operation, condensate flows from pan 64 through slots 77 and tube 75 into pan 72. Upon reduction of pressure in vessel 64 during the cooling operation, condensate in pan 72 boils or percolates, thus carrying vapor and drops of condensate upward in tubes 75 and 76 against the target 78, which serves to distribute this spray through slots 78' over the food product in pan 64. The essential feature of this device, of course, resides in the use of boiling or percolating mechanism to distribute condensate over the surface of the food product during the cooling operation. If desired, steam for the blanching operation may be provided from a separate source, the inlet into vessel 63 being closed during the cooling operation. While the device illustrated in Figure 11 is particularly adapted for domestic use, it will be appreciated the same principles may be employed in a commercial device.

Figure 12:
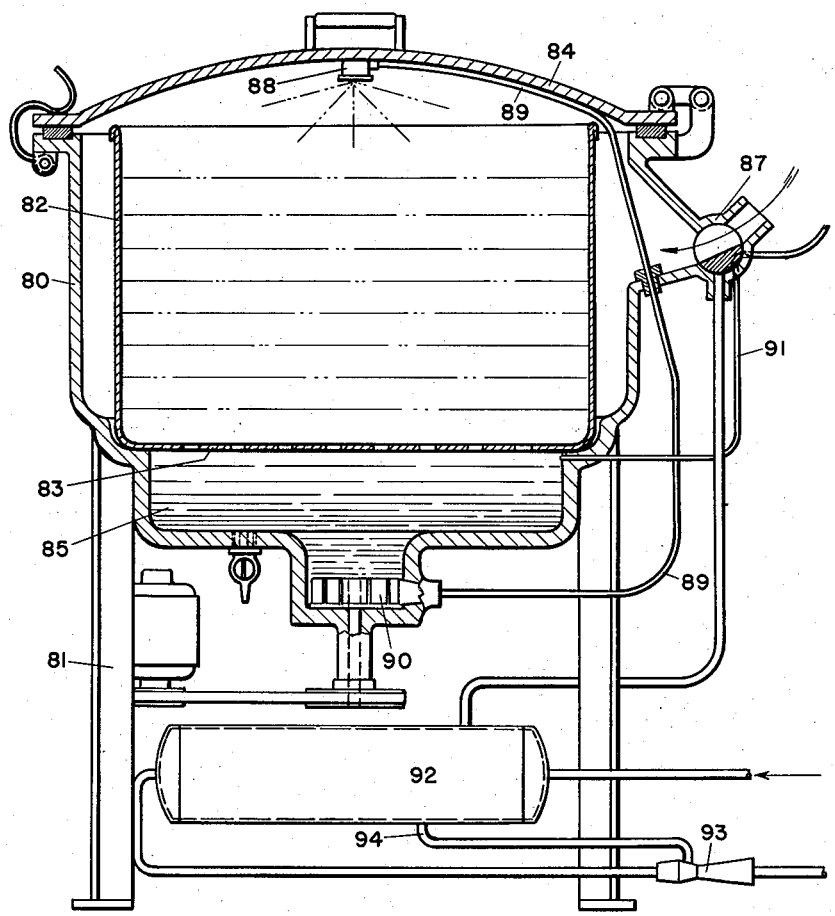
Figure 12 is a sectional view of a blanching and cooling device for commercial use.

A commercial blanching device suitable for processing food products in batches is shown in Figure 12. The device shown in Figure 12 consists of an outer vessel 80 mounted on a suitable base 81 and containing an inner vessel 82 provided with a perforated bottom member 83. A cover 84 is securely clamped to vessel 80 to seal the same during the blanching and cooling operations. A sump 85 is provided in the bottom of vessel 80. Steam is admitted to vessel 80 through three-way valve 87 in such manner that the steam is forced to flow upward in vessel 80 and downward in vessel 82 over the food product. A purge line 91 is connected to vessel 80, such line being opened or closed by movement of valve 87 so that when steam is admitted to vessel 80, the vessel will be purged of non-condensible gases. Valve 87 is connected to a condenser 92 to permit pressure to be reduced in vessel 82 thereby flashing some portion of the liquid therein to cool the product. The usual water ejector 93 is connected to a condenser purge line 94 to purge non-condensible gases from the condenser. Some portion of the vapor condenses on the surfaces of the food product in vessel 82; condensate flows through the perforations in bottom plate 83 into sump 85. Spray nozzles 88 are provided in the top of the vessel and serve to distribute condensate over the surfaces of the food product in the vessel during the cooling operation. The nozzles 88 are connected by line 89 to a pump 90 which forwards condensate from sump 85 to the nozzles 88 for distribution over the food product in vessel 82.

Considering the operation of the device shown in Figure 12, steam is admitted into vessel 80, the steam flowing upward in vessel 80 and downward in vessel 82 over the food product therein. At the same time, the purge mechanism serves to withdraw non-condensible gases from vessel 82. Some portion of the vapor condenses and collects in sump 85. After the product has been heated for a sufficient period of time, valve 87 is actuated to discontinue supply of steam to vessel 80 and to discontinue operation of the purge. Pressure is reduced in vessels 80, 82 by means of the condenser 92 thereby evaporating some portion of the liquid present on the surfaces of the food product to cool the food product. Pump 90 is actuated to forward condensate in sump 85 through line 89 to nozzles 88 which spray the condensate over the surfaces of the food product in vessel 82 to rewet the same.

In normal processing of food to be frozen, according to the present invention, it is customary for food to gain in weight by absorption of water during the blanching and cooling process even though a substantial amount of nutrients are lost in condensate and cooling water. With this process, it is possible to produce a gain in weight without corresponding loss of nutrients. Rewetting the food product by means of the condensate restores the original juices and dissolved solids to the food product and tends to increase the weight beyond the original weight of the food product due to additional absorption in the softened food, particularly when the vacuum is broken by an excess of juices on the food product so that juices rather than air are absorbed by the food product. This is a particularly important feature in commercial blanching since frozen food products are sold by weight. The present blanching and cooling equipment and method of operation permit the reflection of the saving of nutrient losses in the higher total weight compared to former processes.

If desired, the self-actuated percolating mechanism, embodied in the device shown in Figure 11, may be employed in the device instead of pump 90.

Figure 13:
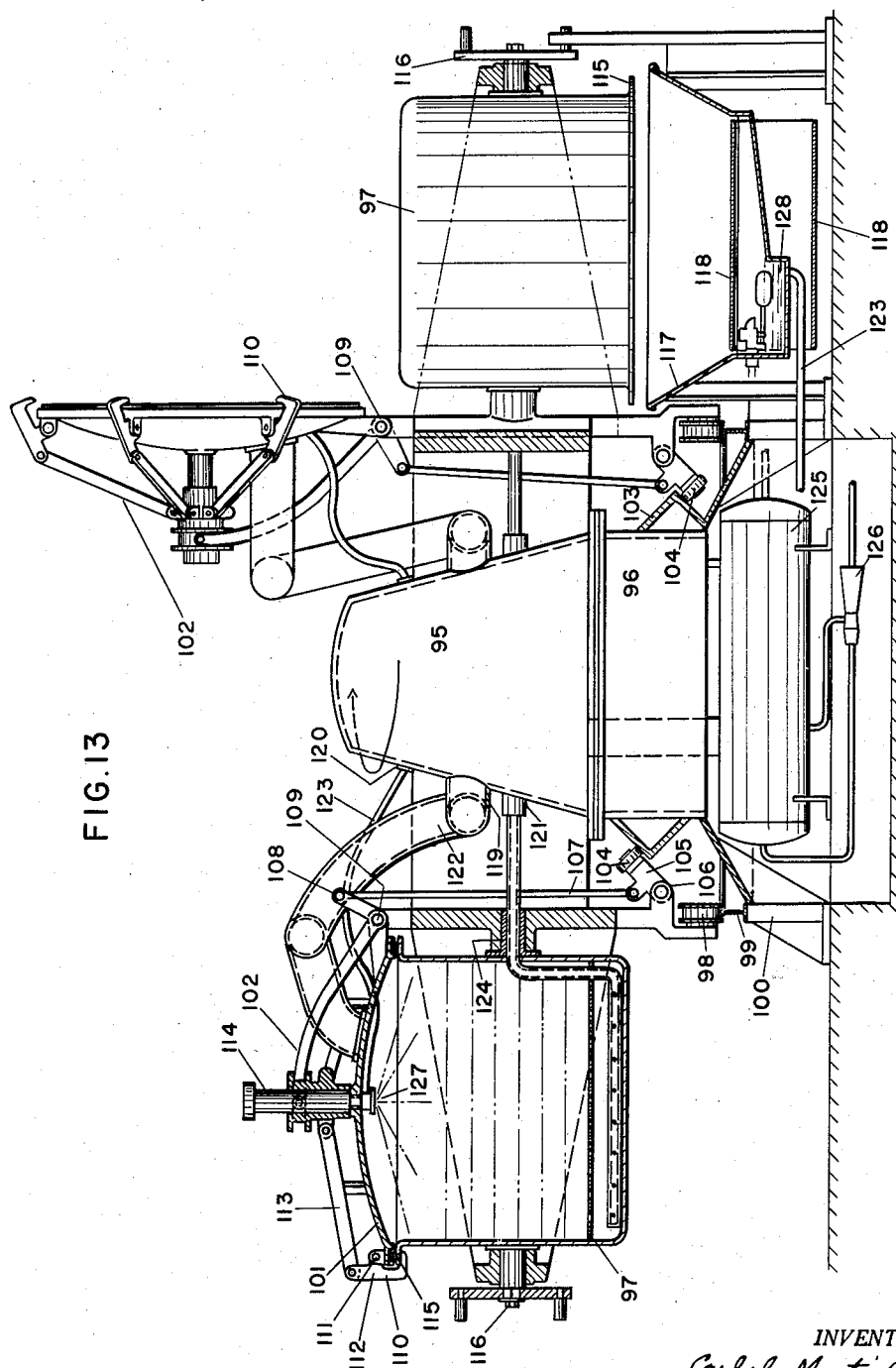
Figure 13 is a view partly in section and partly in elevation of a portion of a continuous blanching and cooling device for commercial use.
Figure 14:
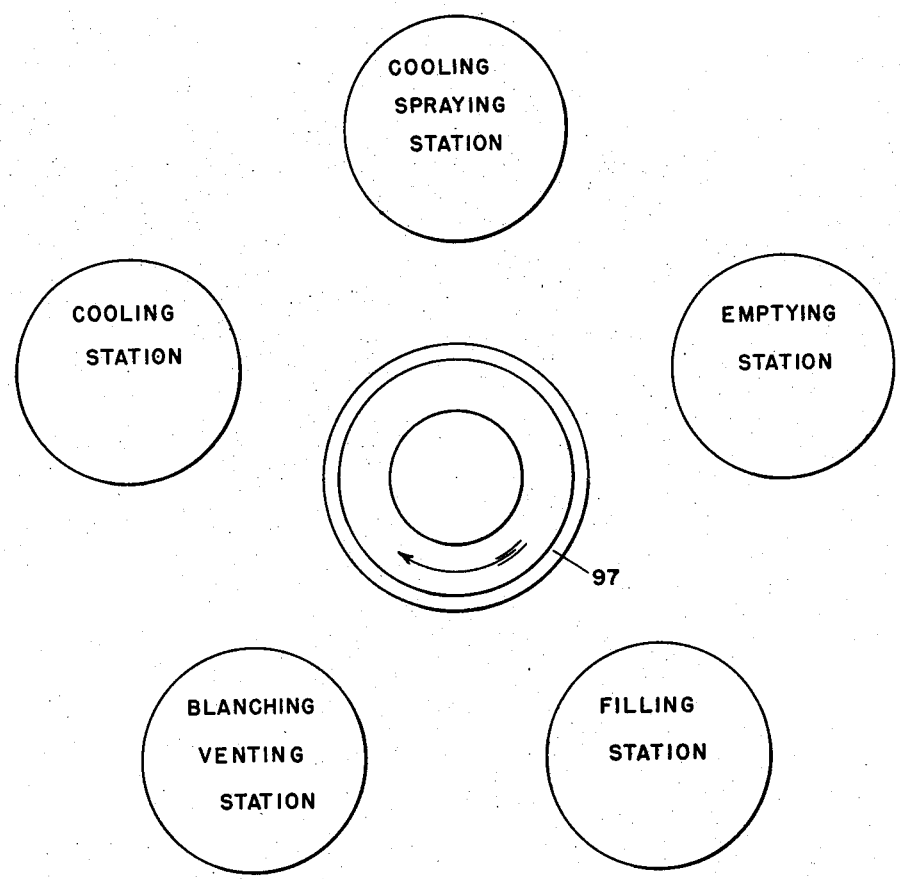
Figure 14 is a diagrammatic view illustrating the various stations of the device shown in Figure 13.

The device shown in Figures 13 and 14 is adapted for commercial blanching conducted as a continuous operation. The device comprises a rotatable central member 95 mounted on a base 96 and carrying a plurality of vessels 97 to receive food products. Vessels 97 are mounted on rollers 98 running on a track 99 supported by the framework 100 of the device. Any suitable means (not shown) may be provided to rotate the vessels continuously or step-by-step about the central member.

Each vessel 97 is provided with a cover 101 which may be raised or lowered and locked in place on the vessel by suitable lifting and locking mechanism 102 actuated by means of a cam member 103. Mechanism 102 includes a cam follower 104 mounted on an arm 105 pivoted at 106 and attached to a rod 107. Rod 107 is connected at the opposite end to a second arm 108 pivoted at 109. Hook or finger members 110 are pivoted at 111 on cover 101 and are connected by links 112, 113 to a central post 114. Thus, as cam member 103 moves follower 104 downward, arm 105 pivots about point 106 moving rod 107 downward. Downward movement of rod 107 pivots arm 108 about pivot point 109 tending to raise cover 101 and to release fingers 110 clamping the cover to flange 115 on vessel 97.

Suitable mechanism shown at 116 is provided to tilt vessels 97 to empty their contents into a chute 117 leading to a continuous screen conveyor 118.

Central member 95 contains ports 119, 120, 121 connected to vessels 97 by flexible connections 122, 123, 124 for steam, condensate and as a purge line. Within member 95 are ported plates (not shown) connected by ducts (not shown) to the ports 119, 120, 121. Depending upon the station at which any vessel 97 is positioned, steam is supplied and the vessel is purged or a vacuum is drawn in the vessel and condensate is sprayed over the food product within the vessel. It will be appreciated each of these operations is performed automatically by the rotation of the central member and vessels.

A condenser 125 is provided to reduce the pressure in the vessel to permit the cooling operation to be conducted, being connected through connection 122 to the vessel in accordance with the rotation of the central member. The usual water ejector 126 is connected to the condenser 125 to purge non-condensible gases therefrom.

Cooling of the food product is accomplished by employing the condenser 125 to reduce pressure in the vessel thereby evaporating liquid present on the surfaces of the food product therein. Rewetting the food product may be accomplished by spray nozzles 127 in the top of vessel 97 which distribute condensate over the surfaces of the products, the nozzles being connected to a supply of condensate by connection 123 as shown.

Food product is supplied to each vessel by means of a belt (not shown) which feeds the product to a tray (not shown) which may be tilted periodically by the motion of the rotating central member 95 to supply the food product to vessels 97. At a second station about the apparatus, the blanching and venting operations are performed. The cooling operation is conducted at a third station. At a fourth station the cooling operation is continued while condensate is sprayed over the food product in the vessel. At a fifth station the food product is emptied from the vessel on the second conveyor belt or screen 118, condensate flowing through the screen and being collected in a pan or sump 128, condensate collected in pan 128 being delivered by the difference in pressure between atmosphere and vacuum over the surfaces of the food product in a succeeding vessel or, if desired, it may be sprayed over the surface of the food product on belt 118.

Nozzles 127 are connected by line 123 to condensate supply (sump 128, for example) in order to rewet the food product in the vessels 97 during the cooling operation.

Considering the operation of the device, a food product is supplied to a vessel 97 at a first station. When the vessel moves to a second station steam is admitted to vessel 97 through connection 122. Simultaneously, air and non-condensible gases are vented from the bottom of vessel 97 through purge line 124. The steam heats the food product in the vessel, some portion of the steam vapor condensing thereon. Condensate flows to the bottom of the vessel. Any excess of condensate may be drawn off through a drain valve (not shown) for reuse during succeeding cooling cycles. At a third station, supply of steam to vessel 97 is discontinued and pressure is decreased in the vessel by means of condenser 125 thereby evaporating condensate to cool the food product. Vapor from the food product, together with any non-condensible gases remaining in vessel 97, is drawn into condenser 125. Removal of the vapor from vessel 97 lowers the pressure therein, thus evaporating condensate collected on the surfaces of the food product to cool the same. A foam breaker may be employed as previously described; if desired the nozzle sprays may be utilized to break any foam. Condensate, including juices and nutrients from previous batches, if desired, is then sprayed over the food product in the vessel at a fourth station, the cooling operation continuing, to rewet the food product thereby recovering juices and water lost during the cooling operation and restoring the original weight or a greater weight as previously described. Sufficient condensate may be sprayed at the end of the operation to submerge the food product in vessel 97, thus assuring a maximum gain in weight. It will be appreciated the weight of the food product may be decreased slightly if desired or may be increased appreciably as desirable in commercial blanching.

Thereafter, at a fifth station, the vacuum in vessel 97 is broken. The cover 101 is released and raised automatically by mechanism 102 and the vessel is tilted by mechanism 116 permitting the food product to drop therefrom onto continuous belt 118.

If desired, an inner perforated metal container for the food product may be employed. If such container be employed, the container is raised and inverted, rather than the vessel itself, to remove the food product from the vessel. Likewise, a hinged bottom may be provided for the vessel to permit the food product to be dropped upon the belt.

In Figure 15, I have illustrated a modified blanching device suitable for commercial blanching operations. The device comprises an inverted steam chamber 130 through which a continuous conveyor belt 131 carrying the food product passes. A drain pan 132 is placed in chamber 130 below belt 131. A second chamber 133 is connected to chamber 130. If desired, chamber 133 may form a portion of chamber 130, being separated from chamber 130 by a partition. A cooling coil 134 is placed in the upper portion of chamber 133.

Cooling mechanism for the food product is provided adjacent chamber 133. The cooling mechanism may comprise a series of cooling coils 135 placed above belt 131; condensate pans 136 are placed below belt 131; pumps 137 are provided to supply condensate from each of pans 136 to nozzles 138 which spray the condensate over the accompanying cooling coils 135 so that cooled condensate is distributed over the food product on belt 131 at each of such stations. Three cooling stations are shown; it will be understood as many similar cooling stations may be provided as may be found necessary.

Steam is injected into chamber 130 through line 139. A valve 140 in line 139 regulates supply of steam to chamber 130. Valve 140 is actuated by means of a bulb 141 placed in chamber 133 responsive to the temperature of a mixture of vapor and air therein as hereinafter described. Steam is injected into chamber 130 in a manner to avoid jetting onto the food product and to avoid turbulence therein.

Considering the operation of the device, the food product to be blanched is placed on conveyor 131 and is carried upward into chamber 130 through the chamber and downward on the opposite end. The level of vapor in chamber 130 is maintained by means of the cooling coil in chamber 133 at the exit end of chamber 130 and by valve 140. A mixture of steam and air rises through forces of gravity and passes over coil 134 where the mixture is cooled and a portion of the vapor extracted. The mixture then circulates through the food product on belt 131, partially cooling the food product and returning again to the entrance side of chamber 133, rising through the food product and again being cooled by coil 134. It will be appreciated bulb 141 is responsive to the temperature of the steam vapor-air mixture in chamber 133 since it is placed adjacent the upper end of chamber 133.

Condensate from the food product being blanched in chamber 130 is collected and forwarded through line 142 to the first pan 136. Pump 137 forwards condensate from pan 136 to nozzle 138 which sprays the condensate over cooling coil 135, condensate being then distributed over the food product on belt 131. Any excess condensate overflows into a second pan 136, the process being repeated at as many stations as may be necessary. Cooling water is passed in counterflow relation through the various coils at the cooling stations and through coil 134 in chamber 133. If desired, condensate flowing from drain pan 132 may be passed in heat exchange relation with cooling water leaving coil 134.

This procedure is particularly desirable since the original weight of the product is substantially increased by absorption of juice by the softened food and the juices and dissolved solids are returned to the blanched and cooled food product. An advantage resides in the fact that only a small quantity of condensate is retained in the cooling systems so that loss of condensate is minimized when the equipment is cleaned.

For some food products, it may be desirable to wash the same with warm water before the product is blanched. For this purpose, I provide a chamber 143 placed immediately prior to chamber 130. Nozzles 144 are provided in the chamber; the base of the chamber forms a sump 145 in which water may be heated. The heated water may be supplied to nozzles 144 by means of a pump 146. The heated water is sprayed over the surface of food product on belt 131 and serves to remove undesirable materials from the surface thereof.

If desired, the leading edge of drain pan 132 may be retracted to permit the initial condensate to be deflected to a separate drain. Little water soluble material will be lost in this condensate because the food product is usually too firm to permit leaching until it is softened by further heating. I have found too that some evaporation may occur in chamber 133, since the mixture of cooled air and vapor passing in heat exchange relation with food product on belt 131 cools the same, permitting some evaporation of condensate on the surfaces of the food product.

The present invention provides a simple, ready, economical method of blanching food products and cooling the same which may be practiced in domestic, and in commercial blanching operations. The method provided by my invention assures that juices and dissolved solids are returned to the food product before freezing and restores substantially the initial weight of the product, which is of particular value in commercial operations. The device provided by the invention is adapted to domestic and to commercial use. The device may be employed to practice the invention as a domestic procedure and may be employed to practice the invention as a continuous process or as a batch process in commercial operation.

It will be appreciated if the food product is heated through the same range as it is cooled, substantially no change in weight of the food product will occur. The food will absorb substantially all of the juices since heating followed by cooling increases the absorptive capacity.

While I have described preferred embodiments of the invention, it will be understood the invention is not limited thereto since it may be otherwise embodied within the scope of the following claims.

I claim:

1. In the method of blanching a food product the steps which consist in placing the food product in a first space, forming steam in a second space separate from the first space, passing the steam so formed downwardly over the food product to heat the food product thereby forming condensate thereon and dissolving nutrients from said food product in said condensate, collecting in the lower portion of the first space during the heating operation condensate having dissolved nutrients therein, a second portion of the condensate remaining on the food product, discontinuing the heating operation, reducing the pressure in the first space to evaporate the second portion of condensate on the food product to cool the food product and simultaneously to cause the collected condensate having the dissolved nutrients in the first space to boil and pass upwardly and be distributed over the food product to be retained by the food product restoring a substantial portion of the nutrient content.

2. A method of blanching a food product according to claim 1 in which condensate having dissolved nutrients is foamed up into the food product.

3. A method of blanching a food product according to the claim 1 in which the condensate having dissolved nutrients is percolated onto the food product.

4. In the method of blanching a food product the steps which consist in placing the food product in a first space, forming steam in a second space separate from the first space, passing the steam so formed downwardly over the food product to displace non-condensible gases from the area of the food product, to heat the food product thereby forming condensate thereon and dissolving nutrients from said food product in said condensate, collecting in the lower portion of the first space during the heating operation condensate having dissolved nutrients therein, a second portion of the condensate remaining on the food product, discontinuing the heating operation, reducing the pressure in the first space to evaporate the second portion of condensate on the food product to cool the food product and simultaneously to cause the collected condensate having dissolved nutrients in the first space to boil and pass upwardly and be distributed over the food product to be retained by the food product restoring a substantial portion of the nutrient content.

References Cited in the file of this patent

UNITED STATES PATENTS

| Number | Name | Date |
|---|---|---|
| 878,020 | Rice | Feb. 4, 1908 |
| 959,448 | Baxter | May 31, 1910 |
| 1,016,339 | Larson | Feb. 6, 1912 |
| 1,374,341 | Vaudreuil | Apr. 12, 1921 |
| 1,445,788 | Millican | Feb. 20, 1923 |
| 1,476,839 | Pugh | Dec. 11, 1923 |
| 1,682,203 | Vischer | Aug. 28, 1928 |
| 1,685,511 | Thomas | Sept. 25, 1928 |
| 1,740,205 | Schmidt | Dec. 17, 1929 |
| 2,418,519 | McBeth | Apr. 8, 1947 |
| 2,515,879 | Korn | July 18, 1950 |
| 2,522,513 | Hammeter | Sept. 19, 1950 |
| 2,551,148 | McBeth | May 1, 1951 |
| 2,581,484 | Helgerud | Jan. 8, 1952 |
| 2,598,220 | Burkhardt | May 27, 1952 |
| 2,622,591 | Bramberry | Dec. 23, 1952 |

OTHER REFERENCES

National Presto Cooker Recipe Book. Copyright National Pressure Cooker Co., 1945, Eau Claire, Wisconsin, pp. 8 to 11 and 89.

"Recipe Book," published about 1945 by the National Pressure Cooker Company, Eau Claire, Wisconsin, pp. 11 and 21.

"Pressure Cookery," January 1947, by L. R. Carroll, published by M. Barrows and Co., Inc., pp. 23, 122, 123, 135, 136, 139, 156 and 159.